(12) United States Patent
Forster

(10) Patent No.: US 6,248,037 B1
(45) Date of Patent: Jun. 19, 2001

(54) HYDROSTATIC MOTOR UNIT

(75) Inventor: Franz Forster, Karlstadt-Mulhbach (DE)

(73) Assignee: Linde Aktiengesellschaft (DE)

(*) Notice: Subject to any disclaimer, the term of this patent is extended or adjusted under 35 U.S.C. 154(b) by 0 days.

(21) Appl. No.: 09/491,911

(22) Filed: Jan. 27, 2000

(30) Foreign Application Priority Data

Jan. 29, 1999 (DE) .............................................. 199 03 563

(51) Int. Cl.[7] .................................................. F16H 47/04
(52) U.S. Cl. ............................................. 475/83; 180/308
(58) Field of Search ................................. 475/83, 73, 80; 180/308, 372

(56) References Cited

U.S. PATENT DOCUMENTS 4,275,616 * 6/1981 Ehrlinger et al. ..................... 74/730
5,820,506 * 10/1998 Mann ..................................... 475/83
6,102,824 * 8/2000 Kosodo et al. ......................... 475/83

FOREIGN PATENT DOCUMENTS 4235710   4/1994 (DE).
0561430 * 9/1993 (EP).

* cited by examiner

Primary Examiner—Sherry Estremsky
Assistant Examiner—Tisha D. Lewis
(74) Attorney, Agent, or Firm—Webb Ziesenheim Logsdon Orkin & Hanson, P.C.

(57) ABSTRACT

A hydrostatic motor unit is provided having two hydraulic motors located coaxial to each other. The motor unit includes a radial piston motor which has a constant absorption volume, is internally pressurized and has multiple-stroke capability, and a reversible axial piston motor that employs a swash plate construction and has a variable absorption volume and is located axially adjacent the radial piston motor.

21 Claims, 1 Drawing Sheet

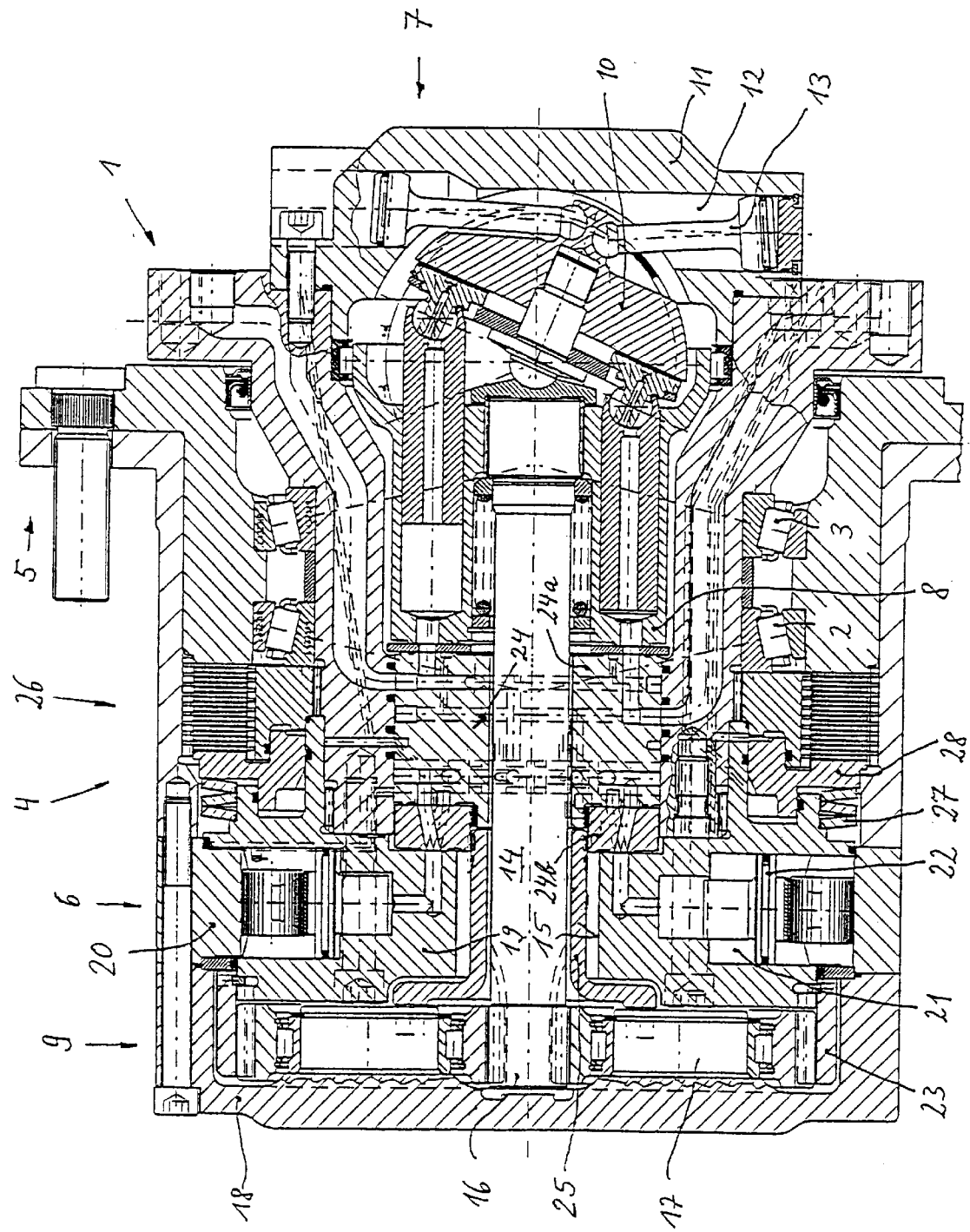

HYDROSTATIC MOTOR UNIT

BACKGROUND OF THE INVENTION

1. Field of the Invention

This invention relates generally to hydrostatic motors and, more particularly, to a hydrostatic motor unit having at least two hydraulic motors that can be connected in parallel, at least one of which has a variable absorption volume, in which the hydraulic motors are coupled to each other on the output side with the interposition of a transmission.

2. Description of the Currently Available Technology

A known motor unit used as the central drive system of a work machine is described in DE 42 35 710 A1. This motor unit consists of a high-speed axial piston motor that has a variable absorption volume and, located axially parallel to it, an internally pressurized radial piston motor that has a constant absorption volume and is used as a low-speed motor. The output shaft of the axial piston motor is provided with a gear wheel which is engaged with gearing that is located on the outside periphery of the rotationally mounted housing of the radial piston motor. The difference in speed between the high-speed motor and the low-speed motor is equalized by a gear ratio reduction in the transmission formed by the gear wheel and the gearing.

When connected hydraulically in parallel, the two hydraulic motors—as a function of their individual absorption volume—each generates an output moment. The two output moments are measured together (summed) to define the total output moment. The radial piston motor can be deactivated by isolating it from the hydraulic circuit and by pressurizing the pistons toward their inner dead center position. The hydraulic fluid released (freed) is thereby available to the axial piston motor. The axial piston motor is set to the minimum absorption volume immediately before the radial piston motor is shut off. When the radial piston motor is shut off, the axial piston motor is very quickly returned to maximum absorption volume, so that it can absorb the additional hydraulic fluid from the radial piston motor without any shifting jolts. This process corresponds to a synchronization. By the subsequent reduction of the absorption volume of the axial piston motor—with a reduced total output moment of the motor unit—the output speed of the motor unit can be further increased compared to the hydraulic parallel operation of the two hydraulic motors, and the possible range of speeds at which the motor unit can be used can be increased.

On account of its large size and the cost and complexity of its construction, the motor unit described above is unsuitable for use in restricted spaces, such as wheel drives. In most cases, such applications require high-speed variable axial piston motors, downstream of which a step-down transmission is connected.

The known art also includes the use of low-speed radial piston motors as wheel drives (direct drive). Radial piston motors, however, do not have a variable absorption volume in a multiple-stroke configuration, which significantly restricts the range of potential applications. In a single-stroke configuration, of course, the absorption volume can be adjusted, but in that case such drive mechanisms represent high-speed motors which require a subsequent reduction in the gear ratio if low output speeds and a high output moment are required.

Therefore, it is an object of this invention to provide a hydrostatic motor unit which is simple, compact and can be used over a wide range of applications.

SUMMARY OF THE INVENTION

The invention provides a hydrostatic motor unit in which the hydraulic motors are arranged coaxial to each other. On one hand, such a motor unit can be configured small enough that it can be used as a wheel drive, and on the other hand it can be used as a variable low-speed engine, i.e. for low output speeds and high power transmission.

In one preferred configuration of the motor unit of the invention that is advantageous in terms of achieving a design that is simple to manufacture and assemble as well as compact, the invention teaches that the motor unit comprises a radial piston motor that has a constant absorption volume (and preferably is internally pressurized and has multiple stroke capability) and an axial piston of swash plate design that is axially next to the radial piston motor and has a variable absorption volume.

The multiple-stroke capability of the radial piston motor results in the maximum power density of the motor unit. The motor unit is able to output a high output moment at low output speeds as a result of the large absorption volume that can be achieved by the multiple-stroke capability. In terms of the ability to vary their absorption volume, axial piston motors represent reliable and easily controlled propulsion mechanisms.

With the hydrostatic motor unit of the invention, an "internal" power distribution is achieved. In hydraulically parallel operation, therefore, the adjustable axial piston motor is first set to maximum absorption volume. As a function of the ratio of the maximum absorption volumes of the constant radial piston motor and the adjustable axial piston motor, and as a function of the output-side load of the motor unit, at a constant output power of a hydraulic pump that pressurizes the hydraulic motors at a determined output speed there are definite output moments of the hydraulic motors, which under these operating conditions are cumulative. If the speed of a vehicle equipped with the motor unit of the invention is to be increased, the absorption volume of the variable axial piston motor can be reduced continuously and without interruption of the traction force. Accordingly, additional hydraulic fluid flows to the constant radial piston motor, as a result of which the speed of the motor unit is increased, as the output moment is reduced.

In one appropriate refinement of the invention, the radial piston motor can be shut down partly and/or completely. The quantity of hydraulic fluid released when the radial piston motor is shut down partly or completely is then available to the axial piston motor to further increase the output speed of the motor unit, which is a requirement for certain applications (e.g. for vehicles that are designed and equipped to operate at high speeds).

For the applications described above, it is advantageous if the radial piston motor is a multiple-row motor, e.g. with two rows. In spite of the large absorption volume, the dimensions in the radial direction can thereby be kept small.

Moreover, if it is possible to shut down at least one motor row of the multiple-row radial piston motor partly (e.g. with respect to individual pistons) and/or entirely, on one hand the axial piston motor can be configured smaller, and on the other hand—depending on the shifting capability of the radial piston motor—there are a number of shifting capabilities that can be realized, in which case the axial piston motor can be used to regulate the different shifting positions.

If the maximum absorption volume of the axial piston motor is less than the absorption volume of the radial piston motor, there are advantages with regard to the dimensions of the axial piston motor and its dynamic response (rapid variation capability of the swash plate because of low inertial forces).

It is particularly advantageous if the axial piston motor is reversible. In the reversed state, and if the direction of rotation of the output rotor of the radial piston motor and the cylinder drum of the axial piston motor remain the same, the direction of flow of the hydraulic fluid in the axial piston motor is reversed. Additional hydraulic fluid can thus be fed to the radial piston motor, which has a constant absorption volume, i.e. in the reversed position, the variable axial piston drive system acts as a pump that is driven by the output rotor of the radial piston motor, and the "delivery volume" of the pump further increases the output speed of the motor unit. In this operating state, consequently, the conversion range, i.e. the speed range of the motor unit of the invention, can be expanded significantly.

In one advantageous refinement of the invention, the hydraulic motors are a component of a hub drive mechanism with a hub that is rotationally mounted on a hub carrier, wherein the output rotor of the first hydraulic motor and an output element of the transmission, which has an input element connected with the output rotor of the second hydraulic motor, are connected so that they drive the hub.

The transmission is advantageously configured as a planetary gear train, and is located on the side of the radial piston motor opposite the axial piston motor.

The invention also teaches that it is advantageous to form the planetary gear train in a single stage, wherein the sun wheel forms the input element and the web forms the output element, and wherein the web is connected with an end cover or is shaped on it, which cover can be connected in rotational synchronization with the hub.

The dimensions of the motor unit of the invention are small because the axial piston motor has an cylinder drum with an external bearing which is connected with an input element of the transmission by means of a torsion bar that is provided on both ends with torque transmission means and extends through a central opening in the radial piston motor. The diameter of the torsion bar can be kept significantly smaller than the diameter of an output shaft of the type that is used in standard axial piston motors because it is only required to absorb torsional forces.

Additional advantages can be achieved if the cylinder drum is located on the axial piston motor on the side closer to the transmission and the swash plate is located on the axial piston motor on the side farther from the transmission. There is more space on the end of the motor unit of the invention inside the vehicle than inside the motor unit for the means to adjust the swash plate. As a result of the external bearing of the cylinder drum and the use of a torsion bar for the transmission of power, the swash plate in contrast to the use of an output shaft that has bearings on both sides of the swash plate—need no longer be penetrated, as a result of which the dimensions of the axial piston motor can be reduced and/or the pivoting angle of the swash plate can be increased with respect to previously known devices.

With regard to a compact supply of the hydraulic motors with hydraulic fluid, it is advantageous if, located axially between the radial piston motor and the cylinder drum of the axial piston motor, there is an axially movable control body in a boring in the hub carrier, wherein the control body has hydraulic channels to supply both the axial piston motor and the radial piston motor with hydraulic fluid.

It is advantageous if the control body has a first and a second control bushing, wherein the first control bushing is secured to prevent rotation in the boring of the hub carrier, and is provided to control the axial piston motor, and wherein the second control bushing is coupled in rotational synchronization directly or indirectly with the output rotor of the radial piston motor and is used to control the radial piston motor. The control body therefore comprises one stationary control bushing and one rotating control bushing.

The invention teaches that to achieve a maximum performance of the radial piston motor with the smallest dimensions, the working chambers of the radial piston motor are preferably stepped, and in each of them there is a stepped piston, the smaller-diameter step of which is located radially inside the larger-diameter step. Stepped working chambers and stepped pistons for radial piston motors are in themselves part of the known art, and make possible a more efficient utilization of the space available toward the radial inside.

Of course, it is also possible to configure the radial piston motor with unstepped working chambers and unstepped pistons (i.e. a conventional construction).

With an eye toward keeping the construction costs of the motor unit of the invention low, in one advantageous configuration the hub carrier is a motor housing that surrounds the cylinder drum of the axial piston motor, which motor housing, in the vicinity of the swash plate, has a cover in which there are means for the adjustment of the swash plate.

In particular in the axial direction, the space required is minimized by an arrangement in which the means to adjust the swash plate have two radially oriented positioning cylinders, in each of which there is a longitudinally movable positioning piston that is effectively or operationally connected with the swash plate.

The invention teaches that it is appropriate to locate a brake between the hub and the hub carrier, which brake is provided with a spring-type brake actuator, in particular at least one pre-stressed Belleville spring washer that generates a braking force, and a brake piston that can be pressurized by hydraulic fluid against the direction of force of the spring-type brake actuator.

Such a brake can be used as a parking brake, to keep a vehicle equipped with the motor units of the invention in its parked position, and thus to prevent it from rolling away.

To release the brake, the brake piston is pressurized so that the force of the spring-type brake actuator is overcome. If the brake piston becomes depressurized as a result of a defect or malfunction, the vehicle is automatically braked until it comes to a stop by the constant braking force generated by the spring-type brake actuator. The brake thus also represents an emergency brake.

To brake a moving vehicle under normal conditions, an additional operating brake is necessary. This operating brake should apply a greater braking force than the parking brake because the inertial forces of the vehicle should be taken into consideration and the braking distance should be as short as possible. The operating brake should also be controllable, i.e. the braking force should be variable, which is not the case with an emergency brake.

The invention teaches that it is therefore particularly advantageous if, in the motor unit of the invention, the braking piston can be pressurized by hydraulic fluid in the same direction as the direction of force of the spring-type brake actuator.

Because the brake piston is pressurized in the same direction as the direction of force of the spring-type brake actuator, the brake can apply an increased braking force. As a result the operating brake can be used in ways that go beyond the types of applications described above, and in which the vehicle is stopped with a braking force which is significantly greater than the force generated by the spring-type brake actuator.

Under certain operating conditions in which the brake acts as a parking brake and the working equipment of the vehicle is being used, e.g. the shovel on a mobile excavator, the braking force applied by the spring-type brake actuator when it is used as a parking brake may not in many cases be sufficient to keep the vehicle in its stopped position when the shovel makes an excavating movement in the ground. The tear-out forces on an excavator that must be absorbed by the parking brake generally exceed the braking force applied by the spring-type brake actuator of the parking brake. An additional working brake is therefore necessary.

Such a working brake becomes available as a result of the pressurization of the brake piston in the same direction as the direction of force of the spring-type brake actuator when the vehicle is stopped.

The motor unit of the invention thus contains, in an extremely small space and with minimal construction effort, a parking brake, an emergency brake, an operating brake and a working brake.

The motor unit of the invention has additional advantages with regard to its compact construction and low maintenance requirements, because the brake is configured as a wet multiple-disc brake.

The invention teaches that the motor unit of the invention is particularly suitable for use in a work machine, in particular in a mobile excavator.

Additional advantages and details of the invention are explained in greater detail below with reference to the embodiment schematically illustrated in the accompanying drawing.

BRIEF DESCRIPTION OF THE DRAWING

The drawing is a side, sectional view of a motor unit of the invention configured as a hub drive.

DESCRIPTION OF THE PREFERRED EMBODIMENTS

As used herein, the terms "left" and "right" refer to the embodiment as it is shown in the drawing figure. However, it is to be understood that the invention may assume various orientations and, hence, such terms are not to be considered as limiting.

In the exemplary embodiment discussed below and shown in the drawing figure, the motor unit of the invention is configured as a hub drive that can be used, for example, for a wheel drive of a mobile excavator.

A hub 4 is rotationally mounted on a hub carrier 1 by means of two conical roller bearings 2 and 3 in an O-arrangement. The hub 4 is provided with a flange 5 for fastening to a wheel rim. The drive of the hub 4 is accomplished by means of a hydrostatic motor unit of the invention which comprises two hydraulic motors arranged coaxial to each other. The first hydraulic motor is configured as a radial piston motor 6 (which has a constant absorption volume). The second hydraulic motor, positioned axially adjacent to the first motor, is configured as an axial piston motor 7 of a swash plate design and has an adjustable absorption volume.

The radial piston motor 6 is configured so that it can be shut down partly or completely, and can also have a plurality of motor rows.

The axial piston motor 7 is located inside the hub carrier 1, which is configured in the form of a motor housing that surrounds a cylinder drum 8 of the axial piston motor 7. On an output side, downstream of the axial piston motor 7, there is a planetary gear train 9 which, in this exemplary embodiment, is a single-stage transmission. The gear train 9 is located next to the radial piston motor 6 and is located on the outside of the motor unit or of the hub drive. As shown in the drawing figure, the cylinder drum 8 is located on the side of the axial piston motor 7 closer to the transmission and an adjustable and reversible swash plate 10 is located on the side of the axial piston motor farther from the transmission. In the vicinity of the swash plate 10 of the axial piston motor 7, the hollow hub carrier 1 is provided with a cover 11, in which the swash plate 10 is pivotably mounted. Two radially oriented positioning cylinders 12, each containing a longitudinally movable positioning piston 13, are effectively connected with the swash plate 10.

The cylinder drum 8 is mounted with external bearings in the vicinity of the swash plate 10, and is connected with a torsion bar 14 that is provided on both ends with torque transmission means. The torsion bar 14 extends through a central opening 15 of the radial piston motor 6 into the planetary gear train 9. The torque transmission means of the torsion bar 14 on the left-hand side of the figure is configured as a sun wheel 16 (input element) of the planetary gear train 9.

The planetary gear train 9 has a web 17 which forms the output element of the planetary gear train 9 and is shaped on an end cover 18 of the hub drive, which end cover 18 is screwed onto the hub 4.

Fastened to the hub carrier 1 is a cylinder block 19 of the radial piston motor 6. An eccentric ring which has on its inside a molded, multiple-stroke piston track, forms an output rotor 20 of the radial piston motor 6. The output rotor 20 is in a driving connection with the hub 4 by means of the threaded connection of the cover 18. In the cylinder block 19, there are working chambers 21 of the radial piston motor 6, which are preferably of a stepped shape. In each working chamber 21 there is a piston 22. A smaller-diameter step of the working chamber 21 and of the piston 22 are each located respectively inside a larger-diameter step.

The planetary gear train 9 is provided with a ring gear 23 which is non-rotationally connected with the cylinder block 19 of the radial piston motor 6 and thus also with the hub carrier 1.

To supply the radial piston motor 6 and the axial piston motor 7 with hydraulic fluid, located axially between the radial piston motor 6 and the cylinder drum 8 of the axial piston motor 7 there is an axially movable control body 24 that comprises a first control bushing 24a and a second control bushing 24b in a central boring of the hub carrier 1. The first control bushing 24a is secured to prevent rotation in the central boring of the hub carrier 1 (e.g. by the action of gaskets), and is provided to control the axial piston motor 7. The second control bushing 24b is coupled with a driver sleeve 25 so that it rotates in synchronization with the web 17 of the planetary gear train 9 and thus with the output rotor 20 of the radial piston motor 6, and is used to control the radial piston motor 6.

Between the hub 4 and the hub carrier 1 there is a brake 26. The brake 26 has a spring-type brake actuator 27 comprising pre-stressed Belleville spring washers. The brake 26 also has a brake piston 28 which can be pressurized by hydraulic fluid opposite to the direction of force of the spring-type brake actuator 27. The brake piston 28 can also be pressurized by hydraulic fluid in the same direction as the direction of force of the spring-type brake actuator 27.

The motor unit of the invention operates as described below:

In hydraulically parallel operation, the variable displacement axial piston motor 7 is initially set to the maximum absorption volume. As a function of the ratio of the maximum absorption volumes of the constant radial piston motor 6 and the adjustable axial piston motor 7, and as a function of the output-side load of the motor unit, at a constant output power of a hydraulic pump that pressurizes one of the two hydraulic motors at a determined output speed, there are definite output moments of the hydraulic motors, which under these operating conditions are cumulative ("internal power distribution"). Then, if the speed of the motor unit of the invention is to be increased, the absorption volume of the variable axial piston motor 7 can be reduced substantially continuously and without interruption of the traction force. Accordingly, additional hydraulic fluid flows to the constant radial piston motor 6, as a result of which the speed of the motor unit is increased, as the output moment is reduced.

If the axial piston motor 7 is reversed (i.e. the swash plate 10 is pivoted beyond the zero position) and the direction of rotation of the output rotor 20 of the radial piston motor 6 and of the cylinder drum 8 of the axial piston motor 7 stays the same, the direction of flow of the hydraulic fluid in the axial piston motor 7 is reversed. The radial piston motor 6, which has a constant absorption volume, can thereby be supplied with additional hydraulic fluid, i.e. in the reversed position, the variable axial piston motor 7 acts as a pump that is driven by the output rotor 20 of the radial piston motor 6, whereby the "delivery volume" of the pump further increases the output speed of the motor unit. Consequently, in these operating conditions, the conversion range, i.e. the speed range of the motor unit, can be expanded significantly.

The motor unit of the invention is kept compact by the fact that the cylinder drum 8 of the axial piston motor 7 has external bearings and the cylinder drum 8 is connected with the sun wheel 16 of the planetary gear train 9 by means of the torsion bar 14 which is provided with torque transmission means on both ends. The diameter of the torsion bar 14 can be kept significantly smaller than the diameter of an output shaft of the type used in standard axial piston motors because it is only required to absorb torsional forces.

As a result of the location of the cylinder drum 8 of the axial piston motor 7 closer to the transmission than is the swash plate 10, more space is available for the means to adjust the swash plate 10. It is thereby also favorable that as a result of the external bearings of the cylinder drum 8 and the use of the torsion bar 14 to transmit the power, there is no longer a requirement for penetrations in the swash plate 10—in contrast to the use of an output shaft that has bearings on both sides of the swash plate. As a result of which, the dimensions of the axial piston motor 7 can be reduced and/or the pivoting angle of the swash plate 10 can be increased.

The brake 26 integrated into motor unit is initially used as a parking brake to keep a vehicle equipped with the motor unit of the invention in a parked position, and thus to prevent it from rolling away. To release the brake 26, the brake piston 28 is pressurized so that the force of the spring-type brake actuator 27 is overcome.

If the brake piston 28 becomes depressurized as a result of a defect or malfunction, the vehicle is automatically braked until it comes to a stop by the constant braking force generated by the spring-type brake actuator 27. The brake 26 thus also represents an emergency brake.

Because the brake piston 28 is pressurized by hydraulic fluid in the same direction as the direction of force of the spring-type brake actuator 27, the brake 26 can apply an increased braking force, which is great enough that the brake 26 can also be used as an operating brake. The operating brake is capable of providing a short braking distance in spite of the inertial forces of the moving vehicle. The operating brake can also be controlled by controlling the effective brake pressure in the same direction as the force of the spring-type brake actuator 27, i.e. the brake force is adjustable, in contrast to a conventional emergency brake.

The brake 26 can also be used as a working brake. For that purpose, as on the operating brake, the brake piston 28 can be pressurized in the same direction as the spring-type brake actuator 27 and generates a braking force that is great enough so that the working equipment of the vehicle can be used, e.g. an excavator shovel on a mobile excavator. In this case, the braking force applied by the spring-type brake actuator 27, when it is used as a parking brake, may not be sufficient in many cases to keep the vehicle in its stopped position when the excavator shovel makes an excavating movement in the ground. The tear-out forces on an excavator that must be absorbed by the parking brake generally exceed the braking force that can be applied by the spring-type brake actuator 27 of the parking brake.

The motor unit thus contains, in an extremely small space and with minimal construction effort, a parking brake, an emergency brake, an operating brake and a working brake. It is small enough to be used as a wheel drive. As a variable low-speed engine, it makes it possible to achieve a high transmission of power at slow, variable output speeds. The multiple-stroke capability of the radial piston motor 6 thereby results in the maximum possible power density of the motor unit. At low output speeds, as a result of the large absorption volume that can be achieved by the multiple-stroke capability, it becomes possible for the motor unit to produce a high output moment.

The above invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A hydrostatic motor unit, comprising:
   at least two hydraulic motors connectable in parallel, at least one of which motors has a variable absorption volume, and
   a transmission, wherein the hydraulic motors are connected on an output side with the interposition of the transmission, and
   wherein the hydraulic motors are located coaxial to each other, and wherein the motor unit comprises a radial piston motor and an axial piston motor axially adjacent the radial piston motor.

2. A hydrostatic motor unit, comprising:
   at least two hydraulic motors connectable in parallel, at least one of which motors has a variable absorption volume; and
   a transmission, wherein the hydraulic motors are connected on an output side with the interposition of the transmission, and
   wherein the hydraulic motors are located coaxial to each other, wherein the motor unit comprises a radial piston motor having a constant absorption volume and an axial piston motor axially adjacent the radial piston motor, the axial piston motor having a variable absorption volume and a swash plate.

3. The hydrostatic motor unit as claimed in claim 2, wherein the radial piston motor can be partly or completely shut down.

4. The hydrostatic motor unit as claimed in claim 2, wherein the radial piston motor includes a plurality of motor rows.

5. The hydrostatic motor unit as claimed in claim 4, wherein at least one motor row of the radial piston motor can be shut down partly or completely.

6. The hydrostatic motor unit as claimed in claim 2, wherein a maximum absorption volume of the axial piston motor is less than the absorption volume of the radial piston motor.

7. The hydrostatic motor unit as claimed in claim 2, wherein the axial piston motor is reversible.

8. The hydrostatic motor unit as claimed in claim 2, wherein the axial piston motor includes a cylinder drum with external bearings, which is connected with an input element of the transmission by a torsion bar that is provided with torque transmission means on both ends and extends through a central opening of the radial piston motor.

9. The hydrostatic motor unit as claimed in claim 2, wherein a cylinder drum is located on a side of the axial piston motor closer to the transmission than the swash plate.

10. The hydrostatic motor unit as claimed in claim 2, wherein the radial piston motor includes stepped working chambers, and wherein in each working chamber there is a stepped piston, a smaller-diameter step of which is located radially inside a larger-diameter step.

11. The hydrostatic motor unit as claimed in claim 2, wherein the radial piston motor is internally pressurized and has a multiple-stroke configuration.

12. The hydrostatic motor unit as claimed in claim 9, wherein located axially between the radial piston motor and the cylinder drum of the axial piston motor there is an axially movable control body in a boring of the hub carrier which has hydraulic channels to feed hydraulic fluid both to the axial piston motor and to the radial piston motor.

13. The hydrostatic motor unit as claimed in claim 12, wherein the control body has a first control bushing and a second control bushing, wherein the first control bushing is secured to prevent rotation in the boring of the hub carrier and to control the axial piston motor, and wherein the second control bushing is coupled in rotational synchronization directly or indirectly with an output rotor of the radial piston motor and is provided to control the radial piston motor.

14. A hydrostatic motor unit, comprising:
at least two hydraulic motors connectable in parallel, at least one of which motors has a variable absorption volume; and
a transmission, wherein the hydraulic motors are connected on an output side with the interposition of the transmission, and
wherein the hydraulic motors are located coaxial to each other, wherein the hydraulic motors are components of a hub drive having a hub mounted rotationally on a hub carrier, wherein an output rotor of one hydraulic motor and an output element of the transmission which has an input element connected with an output rotor of the other hydraulic motor are in a driving connection with the hub.

15. The hydrostatic motor unit as claimed in claim 14, wherein the motor unit comprises a radial piston motor and an axial piston motor axially adjacent the radial piston motor and wherein the transmission is a planetary gear train and is located on a side of the radial piston motor opposite to the axial piston motor.

16. The hydrostatic motor unit as claimed in claim 9, wherein the planetary gear train is a single stage gear train having a sun wheel forming an input element and a web forming an output element, and wherein the web is connected with an end cover or is shaped on the cover, which cover is synchronously connectable with the hub.

17. The hydrostatic motor unit as claimed in claim 14, wherein the hub carrier is a motor housing that surrounds the cylinder drum of the axial piston motor, which motor housing, in a vicinity of the swash plate, has a cover in which there are means for the adjustment of the swash plate.

18. The hydrostatic motor unit as claimed in claim 17, wherein the means for the adjustment of the swash plate comprise two radially oriented positioning cylinders, each having a longitudinally movable positioning piston that is connected with the swash plate.

19. The hydrostatic motor unit as claimed in claim 14, further including:
a brake located between the hub and the hub carrier, which brake is provided with a spring-type brake actuator that generates a braking force; and
a brake piston pressurized by hydraulic fluid opposite to a direction of force of the spring-type brake actuator.

20. The hydrostatic motor unit as claimed in claim 19, wherein the brake piston is pressurized by hydraulic fluid in the same direction as a direction of force of the spring-type brake actuator.

21. The hydrostatic motor unit as claimed in claim 19, wherein the brake is a wet multiple-disc brake.

\* \* \* \* \*

UNITED STATES PATENT AND TRADEMARK OFFICE
CERTIFICATE OF CORRECTION

PATENT NO. : 6,248,037 B1  
DATED : June 19, 2001  
INVENTOR(S) : Franz Forster

Page 1 of 1

It is certified that error appears in the above-identified patent and that said Letters Patent is hereby corrected as shown below:

Column 3,  
Line 55, after "the swash plate" insert dash ( - ).

Column 10, claim 16,  
Line 21, "claimed in claim 9" should read -- claimed in claim 15 --.

Signed and Sealed this

Nineteenth Day of February, 2002

*Attest:*

*Attesting Officer*

JAMES E. ROGAN  
*Director of the United States Patent and Trademark Office*